(12) United States Patent
Khodl

(10) Patent No.: US 12,434,910 B2
(45) Date of Patent: Oct. 7, 2025

(54) ORDER FULFILLMENT OPERATOR TRACKER

(71) Applicant: Dematic Corp., Grand Rapids, MI (US)

(72) Inventor: Michael S. Khodl, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 861 days.

(21) Appl. No.: 17/541,775

(22) Filed: Dec. 3, 2021

(65) Prior Publication Data

US 2022/0177227 A1 Jun. 9, 2022

Related U.S. Application Data

(60) Provisional application No. 63/120,959, filed on Dec. 3, 2020.

(51) Int. Cl.
*B65G 1/137* (2006.01)
*G06K 7/14* (2006.01)
*G06Q 10/087* (2023.01)

(52) U.S. Cl.
CPC ......... *B65G 1/1371* (2013.01); *B65G 1/1378* (2013.01); *G06K 7/1404* (2013.01); *G06Q 10/087* (2013.01); *B65G 2209/04* (2013.01)

(58) Field of Classification Search
CPC .... G06Q 10/087; G06Q 10/08; B65G 1/1378; B65G 1/1375; G05D 1/0234; G06K 7/1404

(Continued)

(56) References Cited

U.S. PATENT DOCUMENTS

| | | |
|---|---|---|
| 6,762,681 B1 | 7/2004 | Danelski |
| 7,504,949 B1 | 3/2009 | Rouaix et al. |

(Continued)

FOREIGN PATENT DOCUMENTS

| | | |
|---|---|---|
| CN | 110826652 A | 2/2020 |
| WO | 2019035879 A1 | 2/2019 |
| WO | 2020142385 A1 | 7/2020 |

OTHER PUBLICATIONS

International Search Report and Written Opinion of the International Searching Authority from corresponding Patent Cooperation Treaty (PCT) Application No. PCT/IB21/61328, indicated completed on Jan. 30, 2022.

*Primary Examiner* — Timothy R Waggoner
(74) *Attorney, Agent, or Firm* — Gardner, Linn, Burkhart & Ondersma LLP

(57) ABSTRACT

Methods and systems are provided for verifying a pick/put operation within an order fulfilment workstation or a storage rack. An optical device observes an operator performing a pick/put operation at the workstation. An indicia is located on the operator such that it is visible to the optical device. Image data of the indicia captured by the optical device is transmitted to a control system of the workstation. The control system determines a relative location of the indicia and then determines the location at which an item was picked from or put to relative to the workstation within a high degree of positional accuracy. The method verifies that the operator has completed the assigned pick/put operation at the required location. The methods and systems may be adapted to track or monitor relative positions of mobile and stationary equipment in an automated warehouse.

20 Claims, 6 Drawing Sheets

(58) Field of Classification Search
USPC .......................................................... 700/216
See application file for complete search history.

(56) References Cited

U.S. PATENT DOCUMENTS

| | | |
|---|---|---|
| 9,171,278 B1 | 10/2015 | Kong et al. |
| 9,632,313 B1 | 4/2017 | Madan et al. |
| 9,900,061 B1 | 2/2018 | Lui et al. |
| 11,120,267 B1* | 9/2021 | Pellegrino .............. G06V 20/35 |
| 2003/0038065 A1 | 2/2003 | Pippin et al. |
| 2008/0183327 A1 | 7/2008 | Danelski |
| 2010/0316251 A1 | 12/2010 | Cowburn et al. |
| 2012/0259482 A1* | 10/2012 | Jeschke ................ G05D 1/0297 |
| | | 414/800 |
| 2014/0083058 A1 | 3/2014 | Issing et al. |
| 2015/0192774 A1* | 7/2015 | Watanabe .............. G06Q 10/08 |
| | | 345/8 |
| 2016/0104109 A1 | 4/2016 | Singel et al. |
| 2016/0247006 A1 | 8/2016 | Hansen |
| 2016/0355337 A1* | 12/2016 | Lert .................... B65G 1/0492 |
| 2017/0003139 A1 | 1/2017 | Taylor et al. |
| 2017/0278051 A1 | 9/2017 | Cohn |
| 2018/0039935 A1 | 2/2018 | Wissinger et al. |
| 2018/0322444 A1 | 11/2018 | Todeschini |
| 2020/0031576 A1 | 1/2020 | Lert, Jr. et al. |

\* cited by examiner

ORDER FULFILLMENT OPERATOR TRACKER

CROSS REFERENCE TO RELATED APPLICATION

The present application claims priority of U.S. provisional application Ser. No. 63/120,959 filed Dec. 3, 2020, which is hereby incorporated herein by reference in its entirety.

FIELD OF THE INVENTION

The present invention is directed to order fulfillment operations, and in particular operator and infrastructure monitoring within order fulfilment facilities.

BACKGROUND OF THE INVENTION

The present invention is directed to order fulfillment processes including picking/putting operations performed by an operator, human or robot. Commonly in e-commerce fulfillment facilities, the accuracy of order fulfillment operations (e.g. item picking) is dependent on the fact that a pick operator places the correct item in the correct order container without any form of validation that an item is placed in the correct location (e.g. order container). Typical operations utilize trust based systems that are prone to inaccuracy and errors. Tracking of worker productivity is commonly based on generic values of containers per hour processed and an average items picked per hour. Goods-to-person (GTP) picking or put wall operators may be directed to pick and put with a light, such as a laser, spotlight, or a pick-to-light device, which may include a display for the quantity to be picked. Human machine interfaces (HMIs) are often integrated into the pick/put process to provide visual aids for the operator. In some known operations, an item may be traceable to the degree that a control system can confirm that an item was placed somewhere in a tote, carton, bin, container, or receptacle, without a high degree or precision as to the actual placement position within the tote, carton, bin, container, or receptacle.

SUMMARY OF THE INVENTION

The present invention provides a pick tracking method and system for reducing or eliminating inaccuracy and errors in pick/put operations that may arise in commonly known trust based operation systems. With the method and pick tracking system of the present invention, specific operational metrics make productivity and throughput calculations more meaningful and accurate for system operation metrics, such as order cycle time, shipping cut-off times for parcel shipping providers, order delivery timing, etc. The pick tracking method and system may eliminate the need to use a light directed pick/put application, as the pick tracking system utilizes a series of cameras (or other optical sensor devices) and an indicia on the operator to track the physical location of the operator's hand in relation to the actual location (e.g. tote, carton, bin, container or receptacle) that requires the pick/put operation. As such, the need for physical devices (e.g. hand-held scanners) and power sources (e.g. batteries) is eliminated or reduced for workstations, put walls, mobile put carts, and other order fulfilment infrastructure.

When the pick tracking method and system are integrated with an automated warehouse having a warehouse control system (WCS) and/or warehouse execution system (WES) software, the order fulfilment workstation is operable to determine, with a high degree of accuracy, the physical placement or pick from location within a tote, carton, bin, container, receptacle, or portion of a workstation. As such, the system may precisely identify locations inside the tote, carton, bin, container, or receptacle, such as within an accuracy of about 1 millimeter to about 3 millimeters of a desired location within the tote.

According to one form of the present invention, a method is provided for verifying a pick or put of an item at a particular location within an order fulfilment workstation. The method includes observing an operator at the workstation with an optical device that is in communication with an order fulfillment control system. The operator performs a pick or put operation/task of picking or putting an item to a particular location in the order fulfilment workstation. The method includes capturing image data, with the optical device, of an indicia located on the operator as the operator performs the pick or put operation at the particular location. The image data captured by the optical device is transmitted to and received by the control system. The method determines the location at which the item was picked from or put to, based on the image data received by the control system. The method includes verifying that the operator has completed the required pick or put operation at the desired location.

In one aspect, the optical device may include a digital camera, a video camera, and/or an infrared sensor and the indicia may include a barcode, a QR code, an infrared target, a biometric indicator, and/or a physical feature of an object or person, which is recognizable by the optical device. In another aspect, the order fulfilment control system may include or be integrated with a warehouse execution system, a warehouse control system, and/or a warehouse management system that operates or manages specific aspects of the order fulfilment process.

In another form of the present invention, a position monitoring system is provided for tracking pick and putt operations within an order fulfilment facility and includes an order fulfillment station having a plurality of support positions in spaced arrangement for supporting receptacles and an optical device configured to capture image data relative to the receptacles within the order fulfillment station. An indicia is disposed on or integral with an operator, and the optical device is configured to capture image data of the indicia. The system includes an order fulfillment control system in communication with the optical device and configured to receive image data from the optical device. The control system is configured to determine a location of the indicia relative to the order fulfilment workstation as the operator picks an item from or puts an item to a particular location within the order fulfillment station, such that the control system is operable to verify the particular location at which the pick or put occurred.

In one aspect, the indicia is disposed on a hand of the operator and the indicia may include a barcode, a QR code, an infrared target, and/or a biometric indicator. In another aspect, the control system is configured to determine location coordinates of the particular location within an accuracy of about 1 millimeter to about 3 millimeters relative to a pre-determined desired location.

In another form of the present invention, a method and is provided for monitoring a location of a first object in relation to another object to update a coordinate database based on the relative location of the first object. The method includes capturing image data of an indicia located on the first object with an optical device disposed at or on a second object or location that is spaced apart from the first object. The optical device and the second object each have known locations. The image data is transmitted to and received by a control system. The method includes determining, with the control system, the location of the first object relative to the location of the second object based on the image data received by the control system. The method includes updating coordinate data in a database of location coordinates to include the determined location of the first object. In various aspects, the first object may include a storage rack disposed in a warehouse with the second object location spaced apart from the rack (e.g. on the frame of the warehouse structure), an operator performing functions in the facility, or an automated guided vehicle (AGV) operating proximate a storage rack such that the control system is operable to determine relative positioning between the rack and the AGV.

In yet another form of the present invention, a position monitoring system is provided for monitoring a location of a first object in relation to another object and is operable to update a coordinate database based on the relative location of the first object. The position monitoring system includes a first object within an order fulfilment warehouse or facility. The first object may include an operator performing functions at an order fulfillment workstation, a storage rack of an automated storage and retrieval system, or an AGV, for example. An indicia is affixed or attached to the first object. The system includes an optical sensing device positioned at a known location apart from the first object and the optical device is operable to identify and capture image data of the indicia. The system includes a control system in electronic communication with the optical device. The control system is operable to receive image data from the optical sensing device, and with the image data, determine a location of the indicia relative to the known location of the optical sensing device. The determined location of the indicia may be stored in a database of location coordinates. The optical sensing device may include a digital camera, a video camera, and/or an infrared sensor, for example. Optionally, the control system is operable to determine relative locations between two objects that are spaced apart from the optical sensing device. For example, an AGV may include an indicia and the optical sensing device is operable to capture image data of the first object and the AGV. The control system receives the image data of the first object and AGV and is operable to determine the location of the AGV's indicia relative to the first object.

Accordingly, the method and system of the present invention provide an order fulfillment workstation to track physical placement of items, monitor the accuracy and completion of pick/put operations, and track productivity of the operator and/or the warehouse/fulfillment facility. The method and system are particularly useful for tracking placement and retrieval of items within an order fulfilment workstation, and may also provide real-time, relative coordinate information of infrastructure within a warehouse. The method may reduce or eliminate the need for operators to physically scan an item or verify the completion of an operation, thereby reducing operator fatigue and increasing productivity and throughput. The method utilizes the warehouse management, execution, and/or control system along with optical devices to track and verify, with a high level of precision, the accuracy and completeness of order fulfillment operations performed by operators, either human or robotic. The method and system may be adapted for determining relative positions of objects other than a operator's hand. For example, the method and system may be utilized to monitor real-time positions of infrastructure within a warehouse, such as a storage rack or an AGV.

These and other objects, advantages, purposes and features of this invention will become apparent upon review of the following specification in conjunction with the drawings.

DESCRIPTION OF THE PREFERRED EMBODIMENTS

Figure 1:
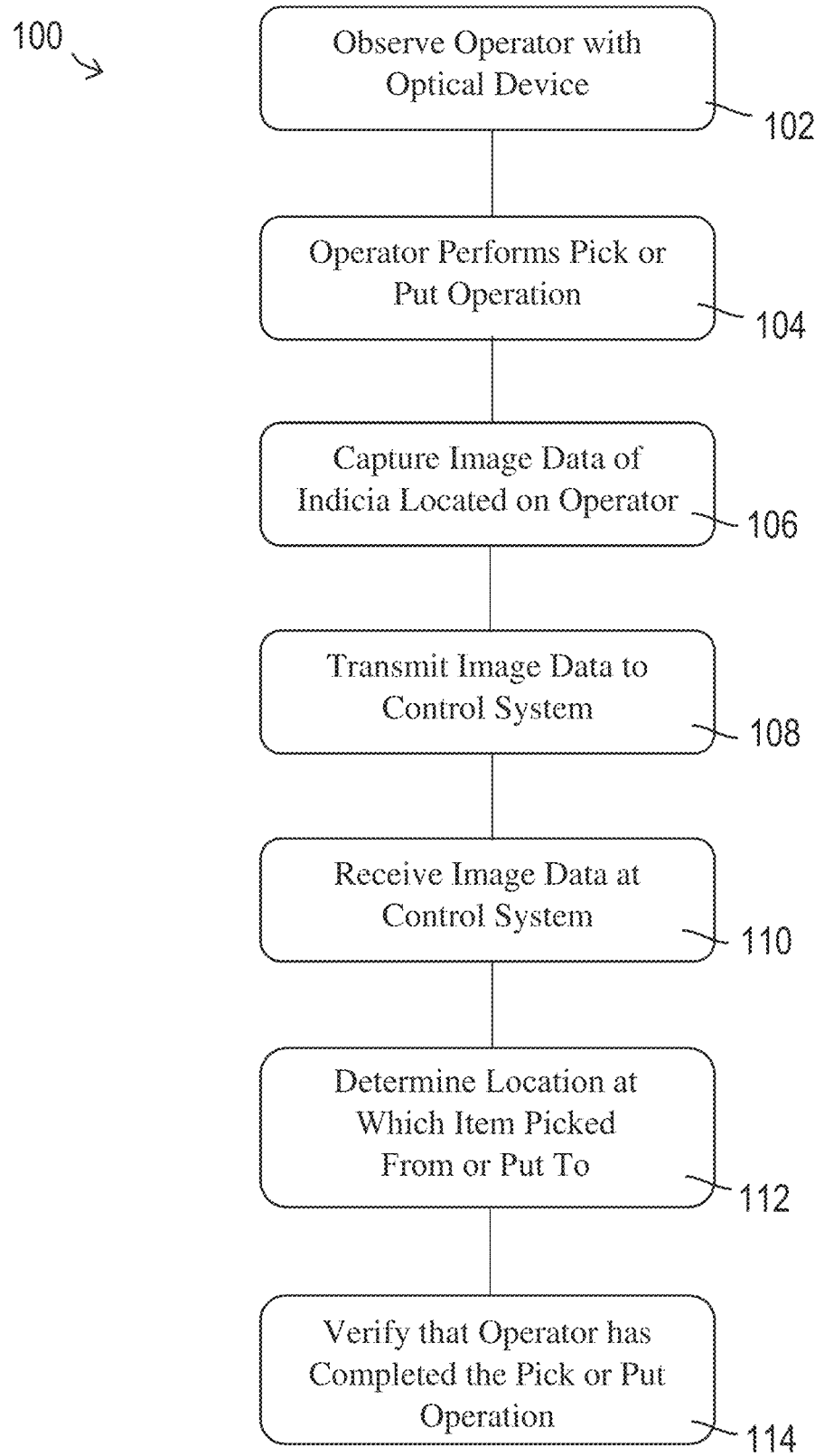
FIG. 1 is a diagram of a method for tracking a pick or put operation, in accordance with an embodiment of the present invention.
Figure 2:
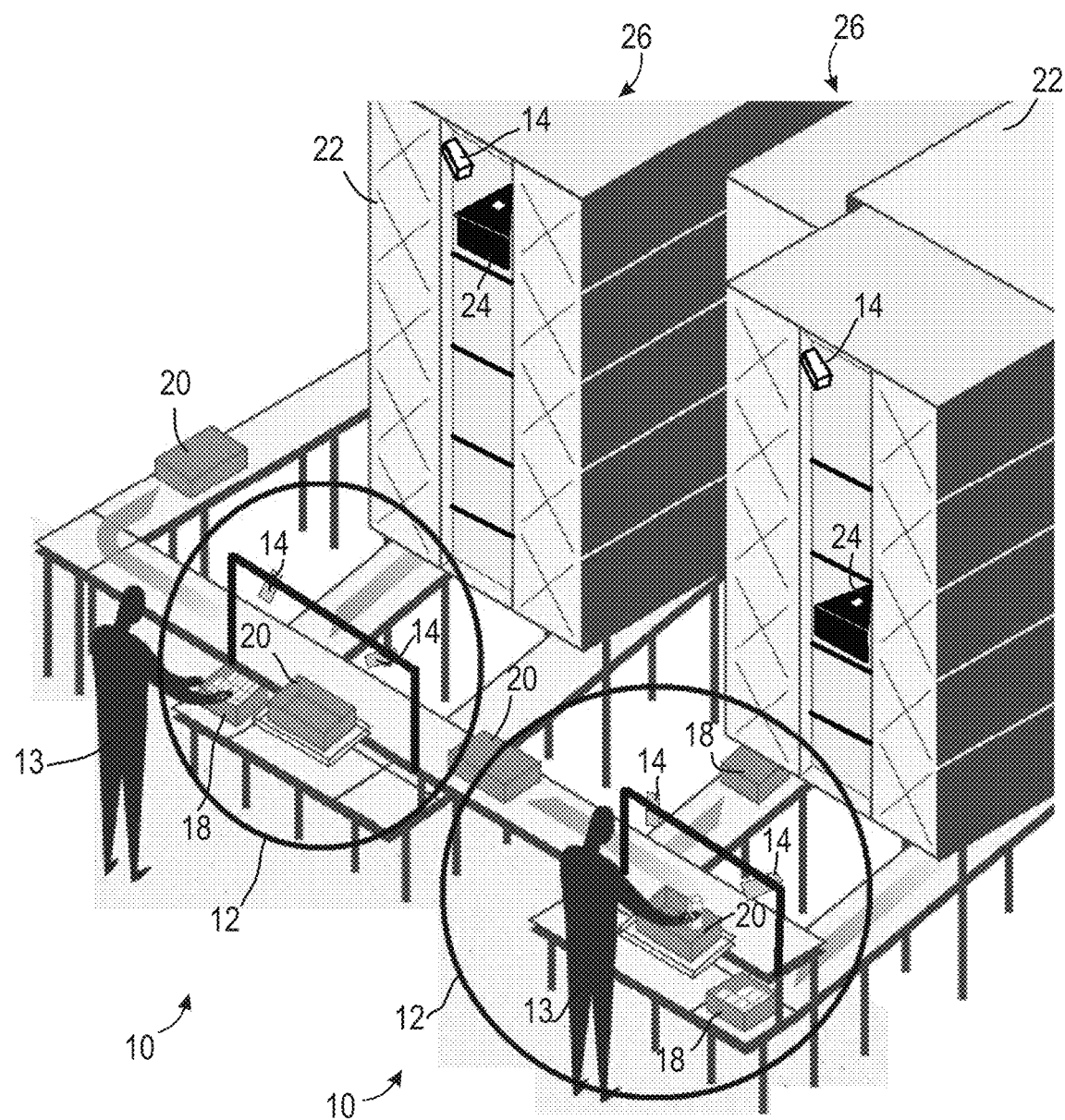
FIG. 2 is a perspective view of an order fulfilment facility including a position monitoring system and a plurality of order fulfilment workstations, in accordance with the present invention.

Referring now to the drawings and the illustrative embodiments depicted therein, a pick tracking method 100 and a location monitoring system, in the form of a pick tracking/tracker system 10, are provided for tracking and verifying a pick or put of an item at a particular location within an order fulfilment workstation 12, such as at a receptacle or bin (FIGS. 1 and 2). The system 10 is operable to track physical placement for item locations, verify order picking accuracy, and track productivity of the operator and/or the warehouse or fulfillment facility. The method 100 and system 10 are operable to determine placement of items at a high degree of accuracy, thereby enabling verification of item placement at a particular location within a receptacle (e.g. within one to three millimeters (1 mm-3 mm) of the desired location in the receptacle). The method 100 is particularly useful for item/piece picking operations as well as case/pallet picking operations. While the method 100 and system are particularly well-suited for tracking pick and put operations within an order fulfillment facility, other embodiments are contemplated, including for monitoring the shift, creep, swell, shrinkage, contraction, etc. of physical infrastructure, such as storage racks, and monitoring relative positions of objects, such as autonomous vehicles within an automated warehouse, for example.

In the illustrated embodiment of FIG. 1, the method 100 includes visually observing 102 an operator 13 at an order fulfilment workstation 12 with an optical device 14 (FIGS. 2-4 and 6-7) that is in communication with an order fulfillment control system. The operator 13 performs 104 a pick or put operation, such as picking or putting an item to a particular location in the order fulfilment workstation 12.

The method 100 includes capturing image data 106, with the optical device 14, of an indicia 16 located on the operator 13 as the operator performs the pick or put operation at the particular location. The image data is transmitted 108 to the control system, and then received 110 at the control system. The control system determines 112 the location at which the item was picked from or put to based on the image data received by the control system. The control system verifies 114 whether or not the operator 13 has completed the pick or putt operation correctly.

The order fulfilment workstation 12 includes a control system that may be integrated with or connected in electronic communication with a warehouse execution system (WES), a warehouse control system (WCS), a warehouse management system (WMS), and/or any other suitable order fulfilment management or operation control system. The order fulfilment workstation 12 of the illustrated embodiment of FIGS. 2-5 is configured as a goods-to-person (GTP) picking workstation and includes a plurality of optical devices 14 located in spaced arrangement above the work area of the workstation 12. The optical devices 14 are electronically connected to the fulfilment workstation 12 and are in electronic communication with the control system of the workstation 12. The optical devices 14 are in direct electronic communication with the control system of the order fulfilment facility. The arrangement of the optical devices 14 is chosen to optimize visual line of sight to the operator 13 to provide optimal line of sight coverage, from at least two optical devices 14, at all locations within the order fulfilment workstation 12. The optical device 14 may include various functionalities including video capability, infrared capability, etc. The arrangement of the plurality of optical devices 14 enable the pick tracking system 10 to generate three-dimensional data of items in the order fulfilment workstation 12 as well as three-dimensional data of the indicia 16 located on the operator 13. The optical device 14 for the order fulfillment workstation 12 may utilize a digital or video imaging device such as described in United States Pat. App. Pub. No. 2007/0188606A, filed on Sep. 14, 2006 (marketed by Radix, Inc. under the name TOOL TRACKER®), or U.S. Pat. No. 10,599,710, filed on Oct. 6, 2016, or an infrared camera such as described in U.S. Pat. No. 9,910,001, filed on Oct. 1, 2015, the disclosures of which are hereby incorporated herein by reference in their entireties.

Figure 3:
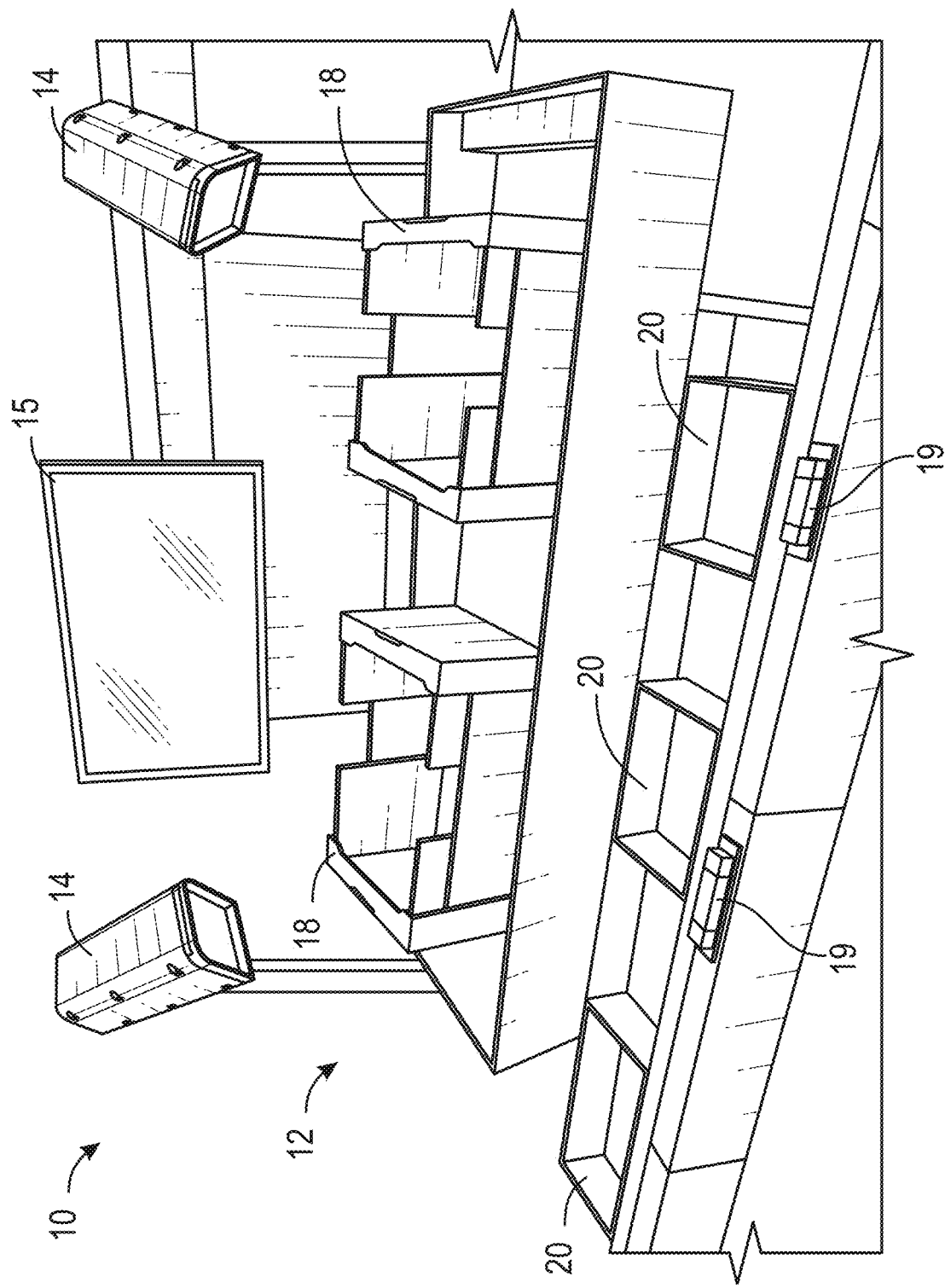
FIG. 3 is a perspective view of an order fulfilment workstation of FIG. 2.
Figure 4:
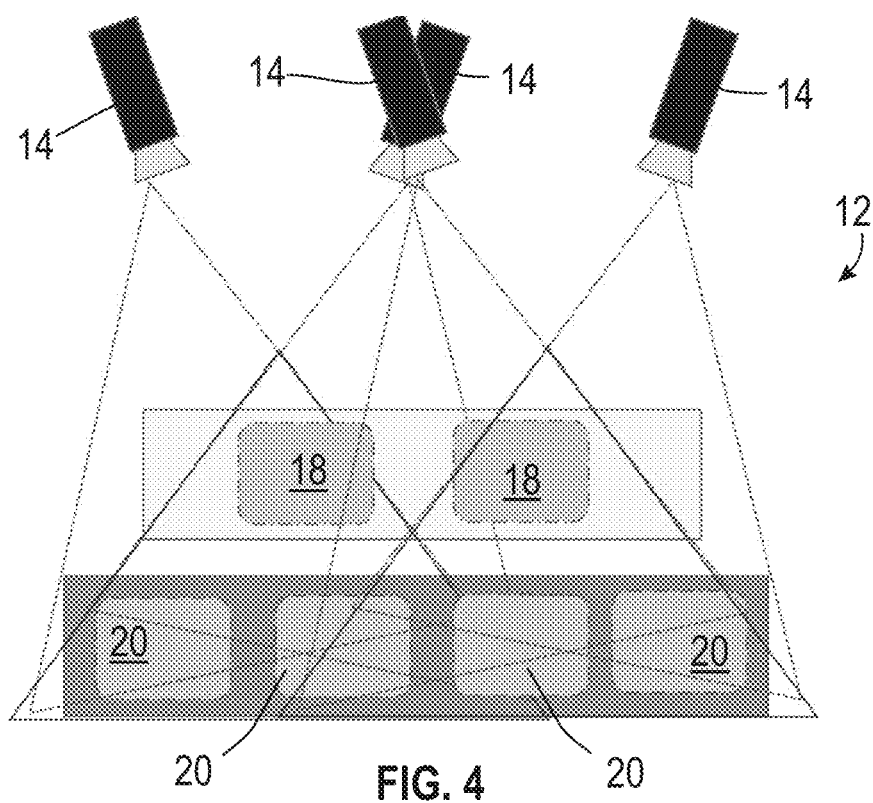
FIG. 4 is a diagram of the order fulfillment station, depicting optical devices of the position monitoring system viewing containers in the order fulfilment workstation.

While the order fulfilment workstation 12 depicted in the illustrated embodiments is a GTP picking station, it will be appreciated that the order fulfilment workstation 12 may include various configurations and functionalities. Examples of suitable configurations of order fulfilment workstations include, but are not limited to, material handling stations such as those marketed by Dematic Corp. under the mark RAPIDPICK® and described in U.S. Pat. No. 8,713,899, filed on Feb. 18, 2011, the disclosure of which is hereby incorporated herein by reference in its entirety, and Dematic Corp.'s modular goods to person system (mGTP). The workstation 12 may utilize a pick-to-light (PTL) system 19 (FIG. 3). The method 100 and pick tracking system 10 can be used with humans 13 and/or robotic operators and for manual and automatic applications. The method 100 may be adapted for pallet picking operations using automated guided vehicles (AGV). The method 100 may also be utilized with zone route picking applications in which shipping containers 20 are automatically routed to required pick zones such that operator movement is minimized. The method 100 and pick tracking system 10 re deployable in both new applications as well as for retrofitting existing order fulfilment facilities.

Figure 5:
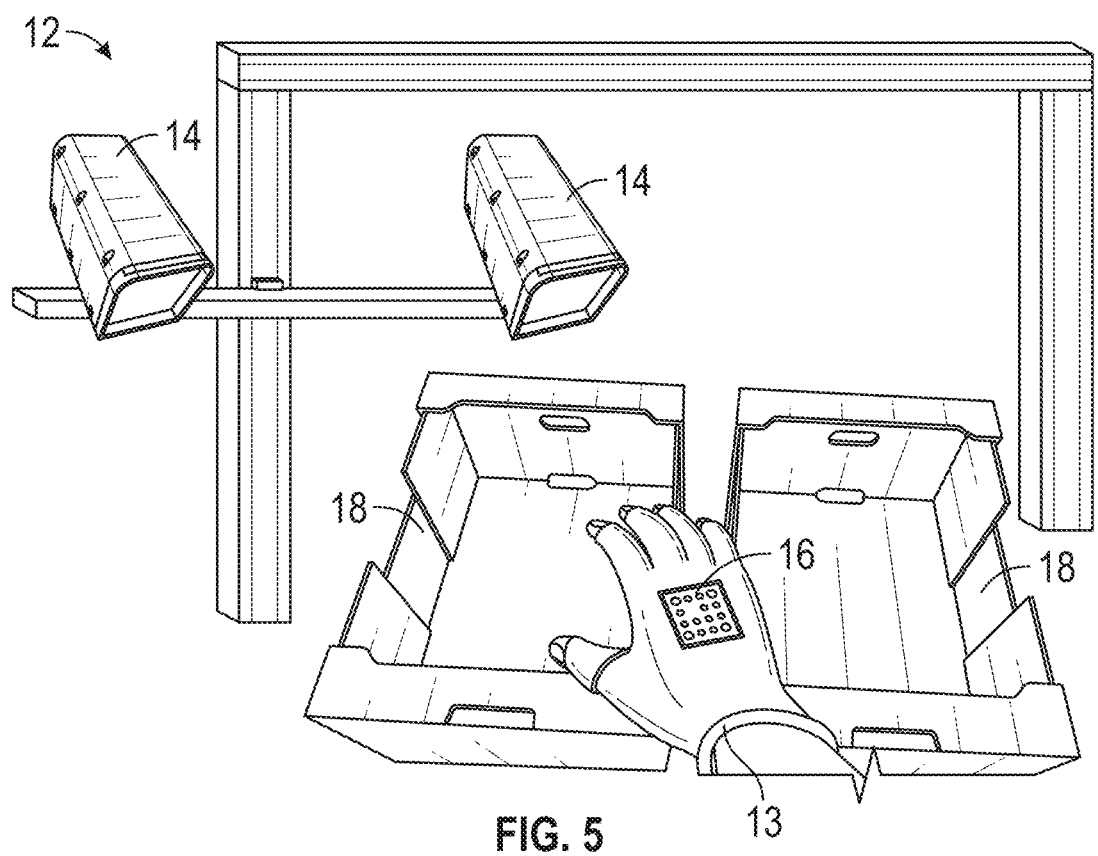
FIG. 5 is a perspective view of a portion of the order fulfilment workstation of FIG. 2, depicting optical devices viewing an operator's hand performing an operation.

The optical device 14 is configured to identify and capture 106, either instantaneously or continuously, image data of an indicia 16 on the operator 13. The indicia 16 may be a physical feature of the operator or piece of equipment, and/or may include an optically readable symbol 16a-16c, a barcode 16f, a QR code 16e, an infrared target, a biometric indicator, an RFID tag 16d or the like (FIG. 7). The indicia may be attached or affixed to the hand of the operator 14, such as on the outer surface of a glove, as shown in FIG. 5. Alternatively, the indicia may be defined by a biometric indicator such as a mole or other skin pattern of the operator 13. As the operator 13 moves about the workstation 12, the optical device 14 captures image data of the indicia 16 and the image data captured by the device 14 is transmitted to the control system. The control system then determines 112 the particular location of the indicia 16 in relation to the order fulfilment workstation 12, including the location coordinates of the particular location within an accuracy of about 1 millimeter to about 3 millimeters. The pick tracking system 10 may be utilized to track operations of items being picked from or put to a defined/standard location such as an inventory bin or tote 18, and may also be utilized to track operations at non-standard locations, such as at a random location on a warehouse floor. The pick tracking system can be configured to verify proper placement of items within a predetermined layout for a bin, receptacle, or container, such as a shipping container 21, or on a pallet, wherein the predetermined layout is optimized based on the size of the receptacle and the items being placed in the container 20 or on a pallet (FIGS. 2-7).

The optical device 14 is electronically powered via the workstation 12 and the indicia 16 requires no means of electrical power, as such, the method 100 and pick tracking system eliminate or reduce the need to include batteries or ancillary power on the operator's person or on-board a mobile put wall or picking cart. Thus, the method 100 and system 10 may increase mobility of the operator 13 and/or equipment to perform pick or put operations and may reduce operator fatigue. The optical device 14 and pick tracking system 10 may enable additional efficiencies to be realized in order fulfilment operations, such as by incorporating the pick tracking system onto mobile autonomous robotic driven pick carts, automatic or manual put walls, and other types of workstations to be used for scaling the operational demands of a workstation 12 and/or warehouse facility. The number of put and pick locations in the order fulfilment workstation 12 may be configured and/or reconfigured based on dynamic order demands within an order fulfilment facility or overall logistics of material handling operations.

Figure 6:
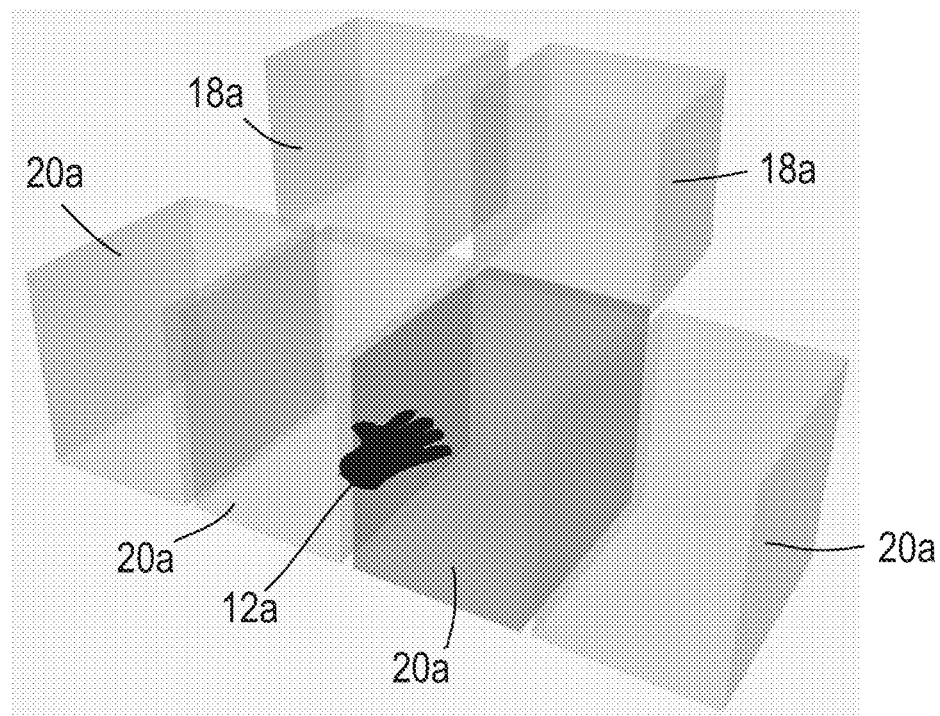
FIG. 6 is a perspective view of a virtual representation of the order fulfilment workstation and operation being performed in FIG. 5.
Figure 7:
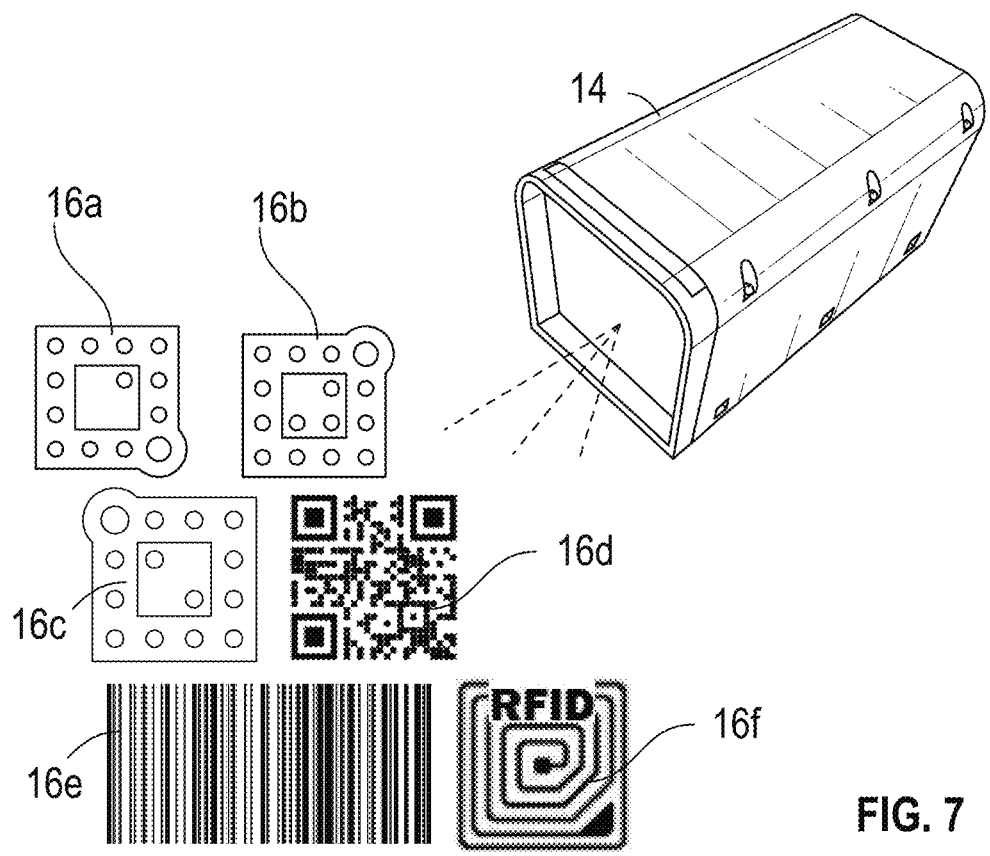
FIG. 7 is a perspective view of an optical device and a plurality of indicia to be view by the optical device, in accordance with the present invention.

The following provides an example of the operation of the pick tracking system 10, as illustrated in FIGS. 2-6. As the operator 13 moves their hand throughout the order fulfilment workstation 12 to perform a pick or put task, the optical device 14 captures image data of the indicia 16 located on the operator 13. The image data captured by the optical device 14 is transmitted to and received at the control system of the workstation 12 or warehouse. As the operator 13 completes the required task the control system is operable to determine and verify, with the image data captured during the performance of the task, whether the required task was performed correctly. A virtual representation of the captured image data, as depicted in FIG. 6, may be presented to the operator 13 by the control system, such as at a human-machine-interface as depicted in FIG. 3. The virtual representation may show the real-time position of the operator's hand as a virtual hand 12a in relation to virtual inventory receptacles 18a and virtual shipping containers 20a (FIG. 6).

The pick tracking system 10 may enable tracking of the productivity of individual order fulfilment workstations 12 and individual operators 13. The productivity information can be provided to the warehouse control system, which can thereby determine how much workflow to direct to each order fulfilment workstation 12. For example, if a particular workstation is producing a higher relative throughput compared to other workstations in the facility, the control system can direct additional workflow to the higher producing workstation to ensure an optimized workflow of the entire facility.

Figure 8:
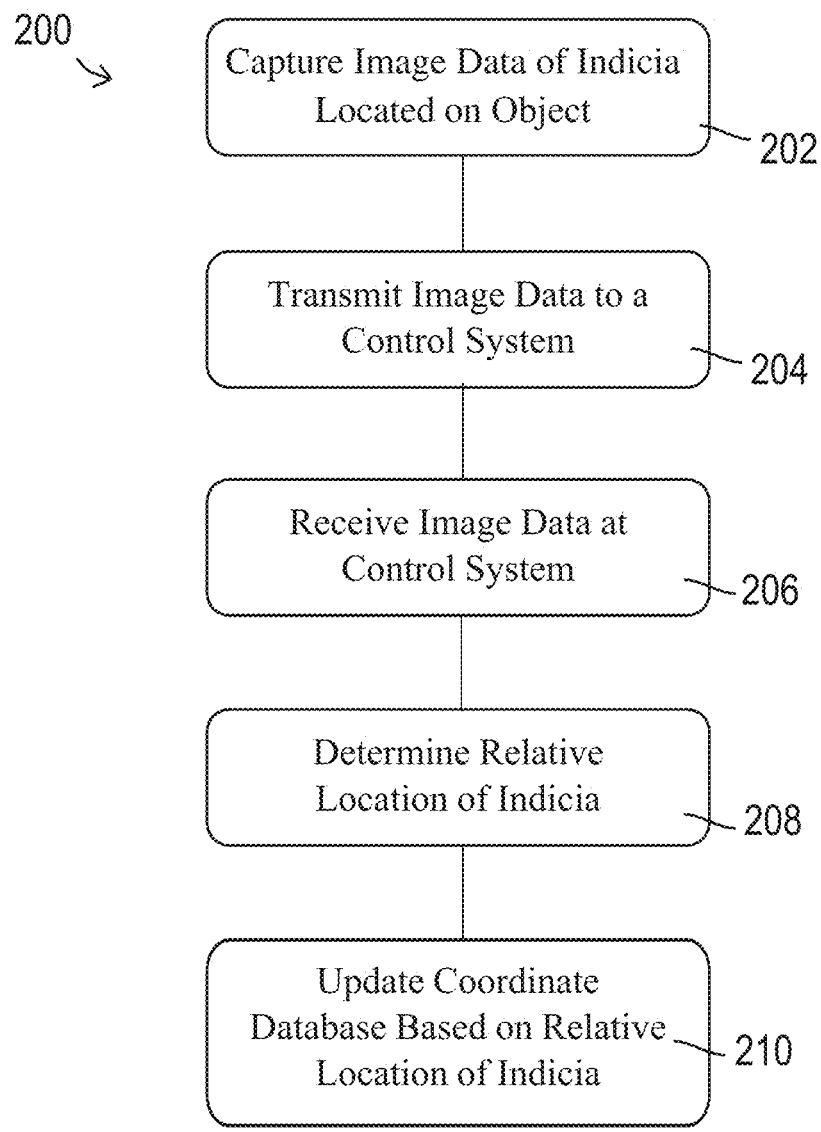
FIG. 8 is a diagram of a method for monitoring a location of one object relative to another object, and updating a coordinate database based on the relative location of the object, in accordance with an embodiment of the present invention.

A method 200 is provided for tracking relative positions of one object relative to another object (FIG. 8). For example, infrastructure elements within an automated warehouse, such as rack structures, with a location monitoring system, in the form of an infrastructure position monitoring system 26 (FIG. 2) that includes similar structure and components and operates similar to the pick tracking system 10 described above and illustrated in FIGS. 2-7, but is configured to monitor components of a warehouse's infrastructure. Accordingly, method 200 of FIG. 8 is similar to method 100 of FIG. 2 in many respects, and includes many similar functions. The method 200 is particularly useful for monitoring the movement of a rack structures 22 due to environmental conditions such as air temperature and humidity within the warehouse. Changes in environmental conditions may cause the rack structures 22 to shift, creep, swell, shrink, and/or contract, which can thereby cause accuracy issues to arise between automated equipment operating in and around the rack structure 22, such as an AGV 24 performing picking or putting operations within the rack structure 22, for example. The method 200 monitors the relative position or location of the rack 22 in order to update a coordinate database that is accessed by the AGV 24 to facilitate performance of precise automated operations. The method 200 includes the steps of capturing image data 202 of an indicia located on the rack 22 (or another object), with an optical device 14 that is disposed at a second object location within the warehouse (e.g. a portion of an adjacent storage rack 22). The second location is spaced apart from the first object in order to determine a relative position between the rack and the optical device, for example. Image data is transmitted 204 to a control system configured for receiving 206 the image data. The control system determines 208 the location of the indicia on the first object relative to the location of the optical device 14 based on the image data received by the control system. The method 200 includes updating 210 a database of location coordinates relative to the determined location of the first object. Optionally, an AGV 24 or other robotic vehicle may be in wireless communication with the database of location coordinates to enable calibration of the AGV 24 to the real-time coordinates of a rack system 22. Optionally, an indicia may be disposed on an AGV 24 operating proximate the rack structure 22 and the method 200 may be adapted to track and monitor the position of the AGV 24 relative to the rack structure 22 and the optical device 14, respectively.

Thus, the pick tracking methods and systems of the illustrative embodiments utilize optical devices in communication with the control system to track, determine, and/or verify the pick/put location of items within an order fulfilment workstation or monitor relative positions of two or more objects. The operator wears or supports an indicia on their person and the indicia may be visually captured by the optical device as the operator performs the pick/put operation. The control system uses the image data from the optical device to determine the location of the indicia relative to the order fulfilment workstation, such as a receptacle. The control system is adapted to verify that the pick/put operation was completed and that the item was placed/picked to a desired location, such as a specific quadrant or portion of a receptacle. Using an optical device to recognize and track indicia on the operator reduces the equipment required to perform and accurately track or verify pick/put operations. Operators are not required to hold equipment, such as a scanner, or press a button in order to verify the completion of an operation. The indicia requires no battery power, thus no substantial weight is added to the operator's hand and fatigue for the operator is thereby minimized. The accuracy with which the pick tracking method and system can verify pick/put operations enables the warehouse control system to optimize workflows to individual order fulfilment workstations and thereby increase throughput of the overall order fulfilment facility. The methods and systems may be adapted to monitor locations or relative positions of one object relative to another object.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method for verifying a pick or put of an item at a particular location within an order fulfilment workstation, said method comprising:
    observing an operator at the workstation with a plurality of optical devices that are in communication with an order fulfillment control system, wherein the workstation comprises a plurality of receptacles in spaced arrangement;
    performing, by the operator, a pick or put operation for an item at a particular three-dimensional location in one of the receptacles of the workstation, wherein the pick or put operation is assigned to the operator by the control system;
    capturing image data, with the optical devices, of an indicia located on the operator as the operator performs the pick or put operation at the particular three-dimensional location;
    transmitting the image data to the control system;
    determining, with the control system, the three-dimensional location of the indicia in relation to the receptacle based on the image data received by the control system; and
    verifying, with the control system, that the operator has completed the assigned pick or put operation at the particular three-dimensional location within the receptacle based on the three-dimensional location of the indicia taking into account movement about the particular three-dimensional location due to environmental conditions including temperature and/or humidity to facilitate performance of precise automated operations.

2. The method of claim 1, wherein each optical device of the optical devices comprises at least one chosen from a digital camera, a video camera, and an infrared sensor.

3. The method of claim 1, wherein the indicia comprises at least one chosen from a barcode, a QR code, an infrared target, and a biometric indicator.

4. The method of claim 1, wherein the order fulfilment control system comprises at least one chosen from a warehouse execution system, a warehouse control system, and a warehouse management system.

5. The method of claim 1, wherein said control system is operable to determine location coordinates of the particular three-dimensional location within an accuracy of between about 1 millimeter to about 3 millimeters relative to a known location at said workstation.

6. The method of claim 1, wherein said determining includes determining the location of the indicia in relation to one of the receptacles based on the image data received by the control system; and verifying, with the control system, that the operator has completed the assigned pick or put operation at the particular three-dimensional location within the receptacle.

7. An order fulfillment workstation comprising:
a plurality of receptacles in spaced arrangement, each receptacle defining an order fulfillment location at which an item may be picked from or put into;
a plurality of optical devices configured to capture image data at said order fulfillment workstation proximate said plurality of receptacles;
an indicia coupled to an operator at said workstation, wherein said optical devices are configured to visually recognize said indicia and receive image data from said indicia;
an order fulfillment control system in communication with said optical devices and configured to receive image data from said optical devices; and,
said control system operable to determine a three-dimensional location of said indicia relative to said workstation based on the image data received from said optical device, and operable to verify whether an operator has completed an assigned pick or put operation at a particular three-dimensional location of an assigned order fulfillment location based on the determined three-dimensional location of said indicia as the operator performs the pick or put operation taking into account movement about the particular three-dimensional location due to environmental conditions including temperature and/or humidity to facilitate performance of precise automated operations.

8. The order fulfillment workstation of claim 7, wherein said indicia is disposed on a hand of the operator and said indicia comprises at least one chosen from a barcode, a QR code, an infrared target, and a biometric indicator.

9. The order fulfillment workstation of claim 7, wherein said control system is operable to determine three-dimensional location coordinates of the particular three-dimensional location within an accuracy of between about 1 millimeter to about 3 millimeters.

10. The order fulfillment workstation of claim 7, wherein said control system comprises at least one chosen from a warehouse execution system, a warehouse control system, and a warehouse management system.

11. A method for monitoring a location of one object in relation to another object with a position monitoring system to update a coordinate database, said method comprising:
capturing image data of an indicia located on a first object with an optical device of the position monitoring system, the first object being in a location, and the optical device disposed at a second object that is spaced apart from the first object, the optical device and second object each having a known location;
transmitting the image data captured with the optical device to a control system;
receiving the image data at the control system;
determining, with the control system, the location of the first object relative to the location of the second object based on the image data received at the control system and movement of the first object about the location due to environmental conditions including temperature and/or humidity; and
updating a database of location coordinates with the determined location of the first object when the first object has undergone movement about the location due to environmental conditions including temperature and/or humidity to facilitate performance of precise automated operations.

12. The method of claim 11, wherein the first object is a storage rack disposed in a warehouse and the second object is disposed at a location spaced apart from the storage rack.

13. The method of claim 12, further comprising wirelessly transmitting the updated location coordinates to an automated guided vehicle configured to provide items to or retrieve items from the storage rack.

14. The method of claim 11, wherein the optical device comprises at least one chosen from a digital camera, a video camera, and an infrared sensor and the control system comprises at least one chosen from a warehouse execution system, a warehouse control system, and a warehouse management system.

15. A position monitoring system comprising:
a first object disposed in an automated warehouse;
a visible indicia disposed on said first object;
an optical device disposed in the warehouse at a known location that is spaced apart from said first object, said optical device configured to capture image data of said indicia; and
a control system in communication with said optical device and configured to receive image data from said optical device, said control system operable to determine a location of said indicia relative to the known location of said optical device based on the image data received at said control system and to monitor movement of the first object due to environmental conditions including temperature and/or humidity to facilitate performance of precise automated operations.

16. The position monitoring system of claim 15, wherein said optical device comprises at least one chosen from a digital camera, a video camera, and an infrared sensor and said control system comprises at least one chosen from a warehouse execution system, a warehouse control system, and a warehouse management system.

17. The position monitoring system of claim 15, wherein said control system is operable to update a database of location coordinates with the determined location of said indicia when the first object has moved.

18. The position monitoring system of claim 17, wherein said first object comprises a storage rack for storing items within the automated warehouse and said indicia is coupled to a portion of said storage rack.

19. The position monitoring system of claim 18, further comprising an automated guided vehicle adapted to perform pick/put operations at said storage rack, said automated guided vehicle wirelessly receives location coordinates from said database of location coordinates.

20. The position monitoring system of claim 19, wherein said indicia comprises a first indicia, further comprising another indicia disposed on said automated guided vehicle, said optical device being configured to visually recognize said other indicia, and said control system is operable to determine the location of said other indicia relative to the known location of said optical device based on the image data received at said control system to determine a position of said automated guided vehicle relative to said storage rack based on a comparison between the determined location of said first indicia and the determined location of said other indicia.

\* \* \* \* \*